United States Patent [19]
Souetre

[11] Patent Number: 5,992,577
[45] Date of Patent: Nov. 30, 1999

[54] ARRANGEMENT OF CARBON BRAKE DISKS FOR AN AIRCRAFT BRAKE UNIT AND A METHOD OF ASSEMBLING DISKS IN SUCH AN ARRANGEMENT

[75] Inventor: Jean Souetre, Paris, France

[73] Assignee: Messier-Bugatti, France

[21] Appl. No.: 08/959,987

[22] Filed: Oct. 29, 1997

[30] Foreign Application Priority Data

Oct. 31, 1996 [FR] France .................................. 96 13338

[51] Int. Cl.⁶ .................................................. F16D 55/36
[52] U.S. Cl. ..................... 188/71.5; 188/71.7; 188/196 R
[58] Field of Search ................... 188/71.5, 71.7, 188/218 XL, 196 M, 250 B, 240; 192/111 R, 70.13, 70.2

[56] References Cited

U.S. PATENT DOCUMENTS

| | | | |
|---|---|---|---|
| 3,480,115 | 11/1969 | Lallemant ............................... | 188/71.5 |
| 4,742,895 | 5/1988 | Bok ......................................... | 188/71.5 |
| 4,982,818 | 1/1991 | Pigford ................................. | 188/218 X |
| 5,099,960 | 3/1992 | Alev ..................................... | 188/218 X |
| 5,323,880 | 6/1994 | Wells et al. ............................. | 188/71.5 |
| 5,494,138 | 2/1996 | Scelsi et al. ............................ | 188/71.5 |
| 5,509,507 | 4/1996 | Wells et al. ............................. | 188/71.5 |
| 5,551,534 | 9/1996 | Smithberger et al. ................. | 188/71.5 |
| 5,558,186 | 9/1996 | Hyde et al. ......................... | 188/218 X |
| 5,862,890 | 1/1999 | Long et al. ............................. | 188/71.5 |

FOREIGN PATENT DOCUMENTS 2004091  5/1990  Canada .

Primary Examiner—Robert J. Oberleitner
Assistant Examiner—Thomas J. Williams
Attorney, Agent, or Firm—Sixbey, Friedman, Leedom & Ferguson, PC; Stuart J. Friedman

[57] ABSTRACT

The invention relates to an arrangement of carbon brake disks for an aircraft brake unit comprising stators coupled to a torsion tube alternating with rotors coupled to the corresponding wheel. The arrangement is organized in two configurations corresponding to operation over two successive wear strokes of the pistons of the brake ring, with a first of the configurations comprising a central group of rotors and stators arranged between a front lateral stator and a rear lateral stator, and with a second of the configurations comprising the same front lateral stator and the same rotors and stators of the central group, but arranged between a spacer disk of thickness less than the wear stroke of the pistons, and a new rear lateral stator of thickness greater than that of the preceding rear lateral stator.

18 Claims, 4 Drawing Sheets

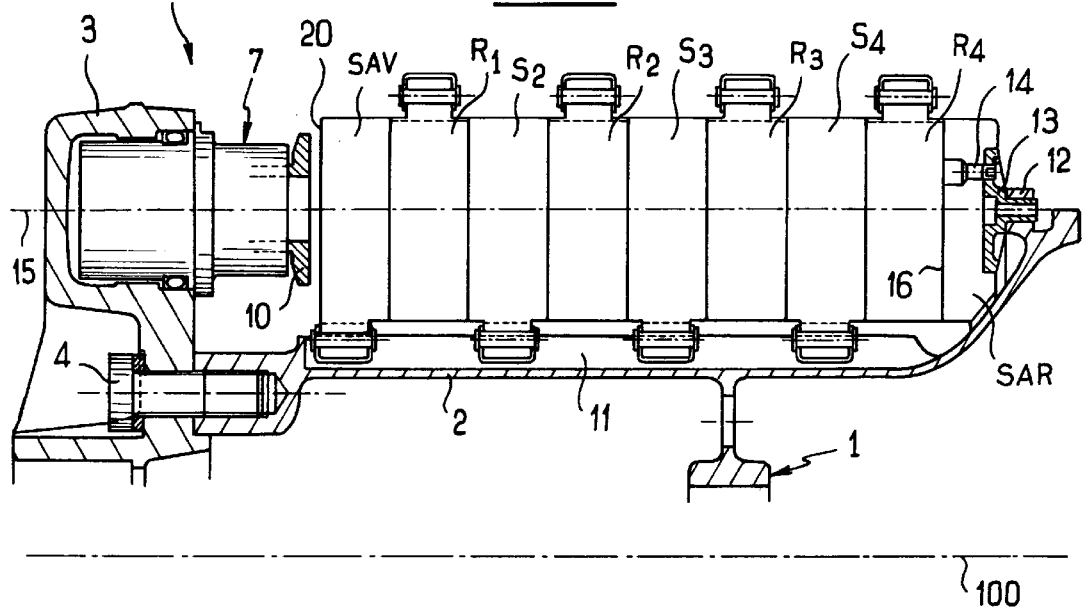
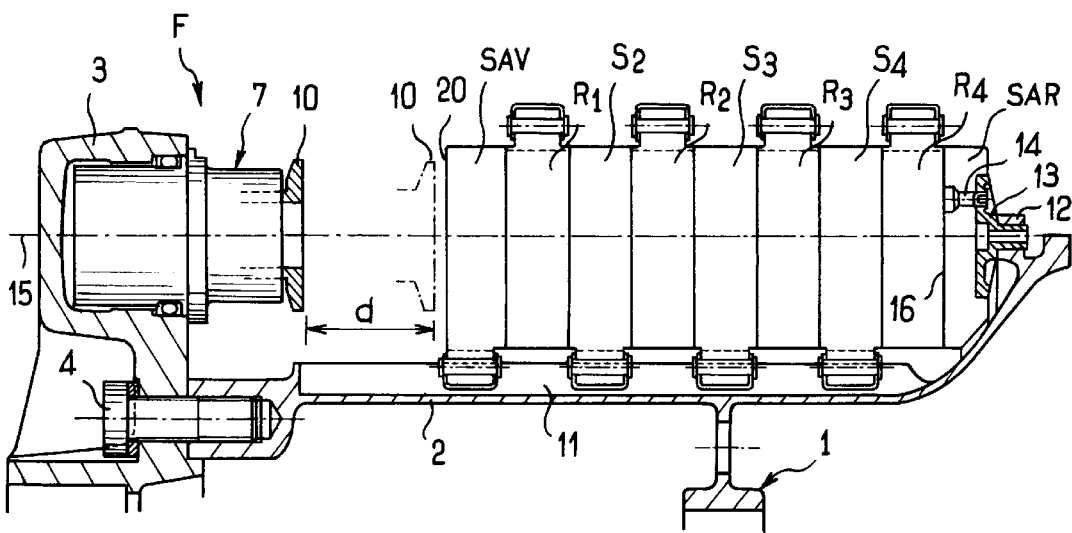

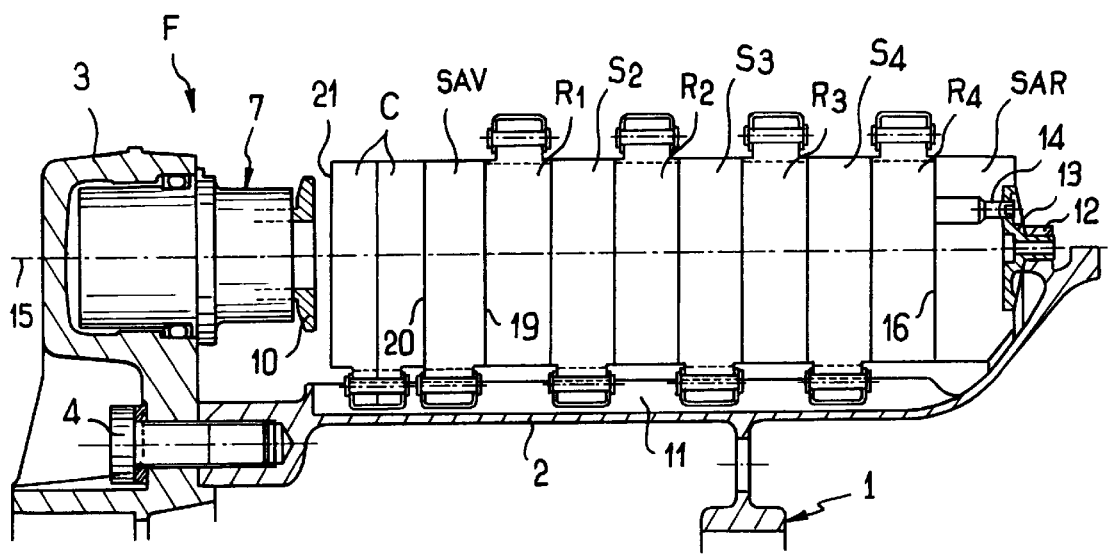
FIG_3
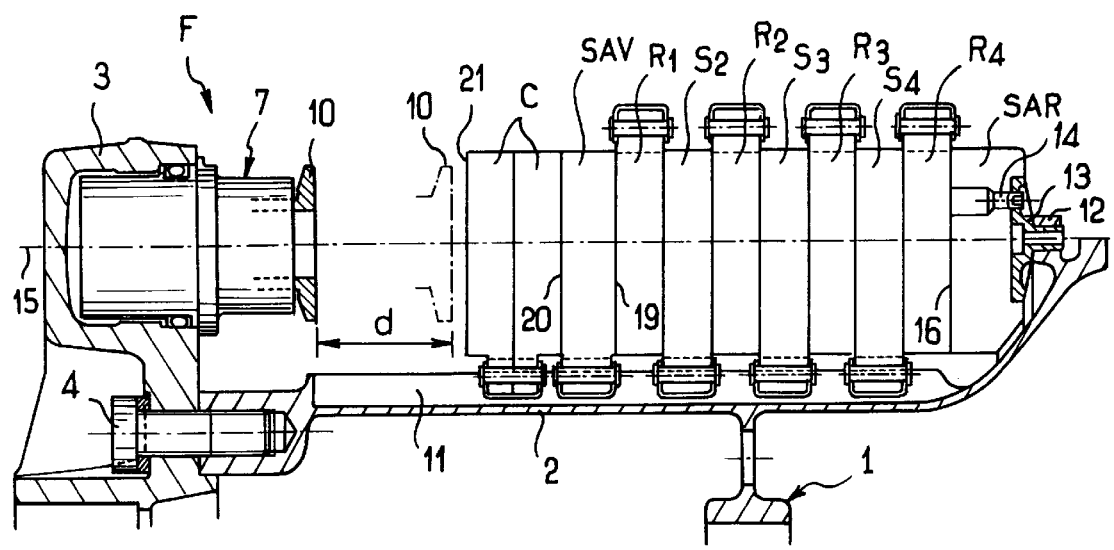
FIG_4

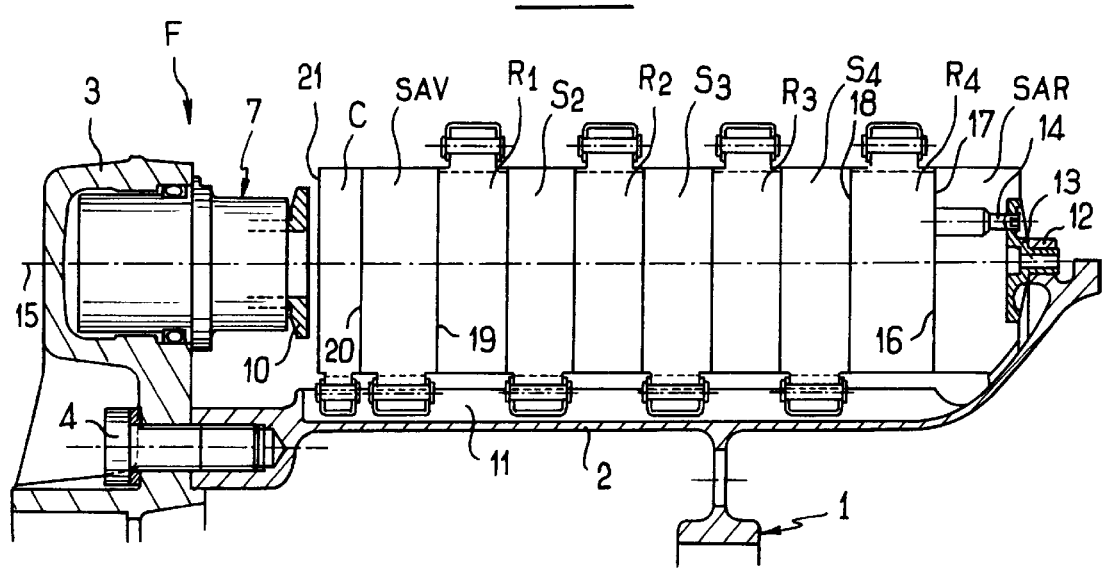
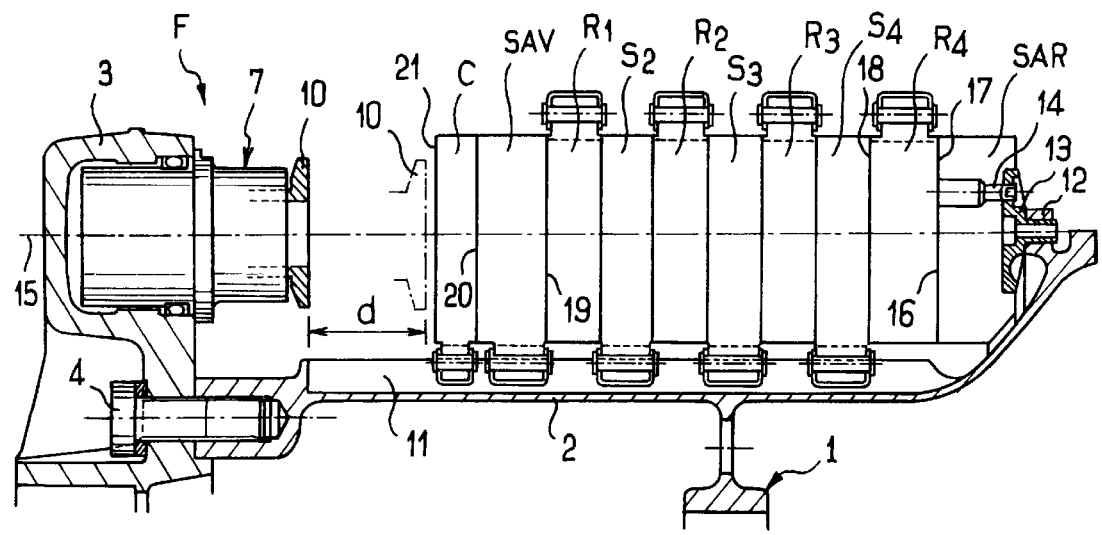

ARRANGEMENT OF CARBON BRAKE DISKS FOR AN AIRCRAFT BRAKE UNIT AND A METHOD OF ASSEMBLING DISKS IN SUCH AN ARRANGEMENT

The present invention relates to the field of carbon disk brakes, and it relates more particularly to the way in which the carbon brake disks are arranged for an aircraft brake unit.

BACKGROUND OF THE INVENTION

An aircraft brake unit usually comprises alternating stators coupled to a torsion tube and rotors coupled to the corresponding wheel, with a front lateral stator at one end adjacent to a braking ring fitted with pistons capable of travelling over a predetermined wear stroke, and with a rear lateral stator at the other end.

An objective of the manufacturers of such carbon disk brake units is to optimize the degree of wear on each individual disk while keeping axial size as small as possible, with a minimum wear stroke for the pistons of the braking ring. Over recent years, manufacturers of brake units have set about defining disk arrangements and ways of substituting disks that make it possible, after operation for a certain length of time, to reuse at least some of the disks so as to increase the operating lifetime of the disks used.

Documents U.S. Pat. No. 4,613,017 and U.S. Pat. No. 4,742,895 thus show one way of replacing some of the brake disks. Those documents teach that previously brake units had been used having a brake ring fitted with pistons capable of a long predetermined wear stroke, and that once said wear stroke had been reached, all of the rotors and stators making up the brake unit were replaced. Those patents teach that under such circumstances it is more advantageous to use rotors that are thicker than the stators, together with two end stators that are thinner than the central stators in the set of disks. Once the predetermined wear stroke has been reached, constituting 50% to 65% of the prior-art wear stroke, then the very thick rotors can have both of their worn faces re-machined and they can be conserved in a new set of replacement disks which then include new, thicker stators, so as to return the set of disks to substantially the same initial total length, and thus be in a position to use up a new wear stroke after reinitializing the piston assemblies. That teaching thus makes it possible to use the rotors twice over, after appropriate resurfacing, and to replace only the stators of the brake unit. Thus, by giving the disks of the brake unit several "lives", each individual disk is used to a considerable extent, while nevertheless retaining a wear stroke that is small.

That technique has the advantage of good equilibrium for the heat sink, but it suffers from the drawback of re-machining all of the contact faces when replacing the stators after a first wear stroke of the pistons, in order to avoid contact between a new face and a worn face on an adjacent disk, since that would give rise to expensive loss of carbon.

An analogous technique is described in document U.S. Pat. No. 5,551,534 in an arrangement that includes thick disks (at both ends and in the middle of the stack) and thin disks. At the end of a half-life, the thick disks change position within the stack to be reused as thin disks, and the thin disks are either discarded or else are associated with one another to build up new thick disks. This suffers from the same drawbacks as those mentioned for the preceding documents.

Another replacement technique is taught in document U.S. Pat. No. 5,323,880. In that technique, replacement is performed step by step by progressively shifting groups of worn disks rearwards, removing the rearmost disks that are the most worn, and putting into place a new group of thick disks at the front. These thick new disks thus move progressively rearwards from the front every time a substitution is performed after the pistons have used up a wear stroke, thereby enabling them to "live" a plurality of "lives" until they are very worn and at the rear, from which they are removed. An analogous technique is described in document CA-A-2 004 091.

That substitution technique with translation presents the advantage of a long period of use for the disks, while conserving paired faces for disks constituting a portion of a replacement group, thereby avoiding the need to machine off carbon and consequently avoiding the above-mentioned drawbacks of carbon losses. Nevertheless, such an arrangement is not always satisfactory from the point of view of thermal equilibrium for the heat sink in so far as the disks at the front are very thick while the disks at the rear are very thin. This effect is particularly marked in that the very thick disks are located in a zone that is less sensitive to heating because it is well ventilated, unlike the very thin disks disposed at the rear of the series of disks.

OBJECTS AND SUMMARY OF THE INVENTION

The invention seeks to improve the techniques outlined above, optimizing the degree of wear of the carbon disks and favoring as much as possible the reuse of worn disks after a first period of use, i.e. once the pistons have reached the predetermined wear stroke.

The invention thus seeks to provide an arrangement of carbon brake disks that enables each individual disk to be worn optimally while remaining within a minimum total axial stroke, and while maintaining satisfactory thermal equilibrium for the heat sink.

According to the invention, this problem is solved by an arrangement of carbon brake disks for an aircraft brake unit comprising stators coupled to a torsion tube alternating with rotors coupled to the corresponding wheel, with a front lateral stator at one end adjacent to a braking ring fitted with pistons capable of travelling over a predetermined wear stroke, and with a rear lateral stator at the other end. The arrangement is organized in two configurations corresponding to operation over two successive wear strokes of the pistons, a first of the configurations comprising a central group of rotors and stators arranged between the front lateral stator and a rear group comprising at least the rear lateral stator, and the second configuration comprising the same front lateral stator, and the same rotors and stators of the central group, arranged between a carbon spacer disk adjacent to the pistons and of a thickness that is less than the wear stroke of the pistons, and a new rear group of total thickness that is greater than that of the preceding rear group, the sets of carbon disks constituted in this way having, at the beginning of use, substantially the same total length in each of the configurations.

Thus, the front lateral stator and also the rotors and stators of the central group are used in both configurations, thereby making it possible to conserve those disks untouched, together with their paired contact surfaces. In addition, the fact of providing a spacer disk of thickness that is less than the piston wear stroke makes it possible to optimize thermal equilibrium of the heat sink, while maintaining the disks of the central group in a middle axial position, because the rear lateral stator which is very thick at the beginning of use is included in the second configuration.

In a first embodiment, the rear group is constituted by the rear lateral stator on its own. In this case, all of the rotors in the set of disks are part of the central group which is used in both of the above-mentioned configurations.

In a variant, the rear group is constituted by the rear lateral stator together with the rotor which is directly adjacent thereto. More generally, the rear group interface could be offset further towards the center of the set of disks, but such offsetting runs the risk of being unfavorable from the point of view of disk reuse. That is why, in practice, the rear group includes no more than the rotor which is directly adjacent to the rear lateral stator, possibly together with the stator adjacent to said rotor.

Preferably, the thickness of the rear lateral stator is selected to be greater at the end of use in the second configuration than at the beginning of use in the first configuration.

For a rear group constituted by the rear lateral stator and the rotor which is directly adjacent thereto, it is advantageous for the thickness of said rotor likewise to be selected to be greater at the end of use in the second configuration than at the beginning of use in the first configuration.

It is also advantageous for the rear lateral stator to be connected to the torsion tube via circumferentially distributed studs, said studs serving as torque transmission members. This is made possible by the substitution performed on the rear group which enables thickness to be added, and provides the advantage of making it possible to decrease the axial size of the torsion tube in both configurations, thereby saving space for the wheel.

It is also advantageous for the rotors and stators of the central group to have the same thickness. This makes it possible to avoid alternating thick disks and thin disks which is unfavorable for thermal equilibrium. It is then preferable for the rotors and stators of the central group to be selected to have initial thickness such that, at the end of use in the second configuration, said thickness is greater than half the thickness of the same rotors and stators at the beginning of use in the first configuration. This is favorable for subsequent reuse of the rotors and stators of the central group.

Also preferably, the initial thickness of the front lateral stator is selected so that at the end of use in the second configuration it is greater than half the initial thickness of the stators of the central group at the beginning of use in the first configuration. This makes it possible to envisage reusing the front lateral stator as a half-stator in the central group. It is then preferable for the above-mentioned initial thickness of the front lateral stator at the beginning of use in the first configuration likewise to be selected so that at the end of use in the second configuration it is greater than the thickness of the spacer disk. This makes reuse as a spacer disk possible.

In a particular embodiment, it is possible to provide for at least one of the disks of the group comprising the spacer disk, the front lateral stator, and the rotors and stators of the central group to be constituted by two same-thickness half-disks put together and secured to each other. It is then possible to use a "clipping" technique for assembling together two half-disks, each having one face against the other.

The invention also provides a method of assembling carbon brake disks in an arrangement of the above-defined type, the method consisting in putting into place a set of disks comprising, in succession, forwards from the back: a rear group comprising at least a rear lateral stator; a central group of rotors and stators; and a front lateral stator, said first configuration of the arrangement being conserved until the maximum wear stroke of the pistons has been reached, after which the pistons of the brake ring are reinitialized, and said set of worn disks is replaced by another set of disks comprising in succession, forwards from the back: a new rear group of thickness greater than the initial thickness of the preceding rear group; the central group comprising the already part-worn rotors and stators of the preceding set; the already part-worn front lateral stator of the preceding set; and a carbon spacer disk of thickness that is less than the wear stroke of the pistons, said second configuration of the arrangement being conserved until a new maximum wear stroke of the pistons is reached.

In a first implementation of the method, the replaced rear group is constituted by the rear lateral stator on its own.

In a variant, the replaced rear group is constituted by the rear lateral stator together with the rotor which is directly adjacent thereto.

It is also advantageous at the end of use in the second configuration, for the rear lateral stator to have its worn face re-machined so as to be capable of being reused in another set of disks as the rear lateral stator at the beginning of use in the first configuration.

In similar manner, for a replaced rear group which is constituted by the rear lateral stator together with the rotor which is directly adjacent thereto, it is advantageous at the end of use in the second configuration, to provide for the rotor which is directly adjacent to the rear lateral stator to have at least one of its two worn faces re-machined so as to be capable of being reused in another set of disks as the rotor of the rear group at the beginning of use in the first configuration.

Also preferably, at the end of use in the second configuration, at least one of the rotors and stators of the central group is re-machined on both worn faces so as to be capable of being reused respectively as a half-rotor or as a half-stator in the central group of another set of disks at the beginning of use in the first configuration.

It is also advantageous, at the end of use in the second configuration, to provide for the front lateral stator to have its worn face re-machined so as to be capable of being reused in another set of disks as a half-stator at the beginning of use in the first configuration, or as a spacer disk or half-disk at the beginning of use in the second configuration.

BRIEF DESCRIPTION OF THE DRAWINGS

Other characteristics and advantages of the invention appear more clearly in the light of the following description and the accompanying drawings, relating to particular embodiments and in which:

FIGS. 1 to 4 show a first embodiment of the invention in which the arrangement of disks includes a central group of rotors and stators disposed between the front lateral stator and a rear group constituted by the rear lateral stator on its own, respectively at the beginning of use in a first configuration (FIG. 1); at the end of use in said first configuration (FIG. 2); at the beginning of use in a second configuration (FIG. 3); and at the end of use in said second configuration (FIG. 4);

FIGS. 5 to 8 show a variant of the above arrangement, in which the rear group includes not only the rear lateral stator, but also the rotor immediately adjacent thereto, with the four figures showing in like manner the beginning and the end of use in the first configuration and in the second configuration.

MORE DETAILED DESCRIPTION

Figure 5:
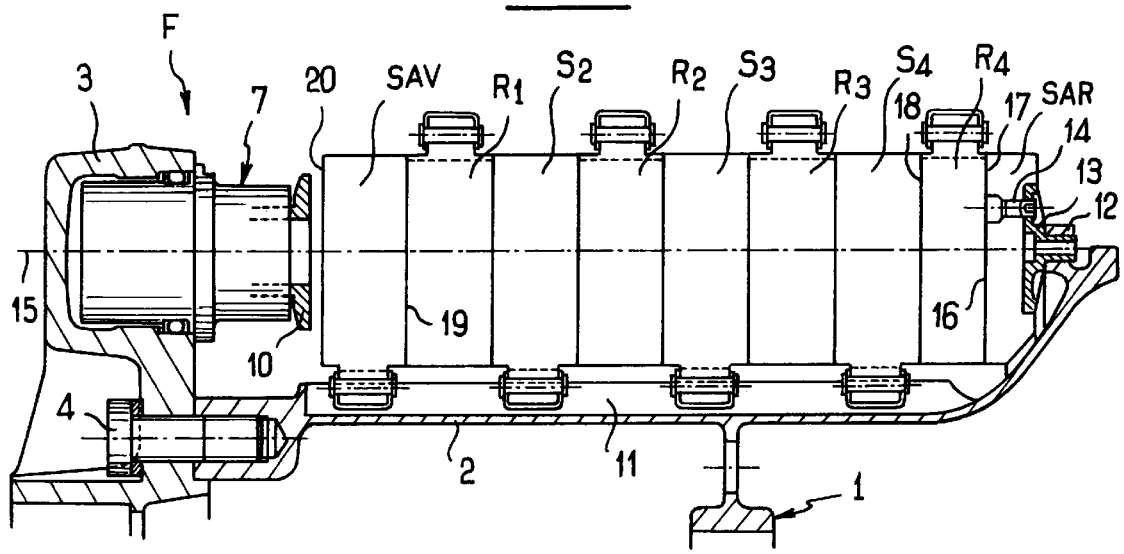

FIGS. 1 to 4 show an aircraft brake unit F comprising a central stator portion 1 about an axis 100 (the axis 100 being shown in FIG. 1 only), including a torsion tube 2 having a braking ring 3 fixed to the front thereof, e.g. by means of bolts 4, the ring being fitted with a plurality of piston assemblies 7 each capable of travelling along a predetermined wear stroke by means of a wear take-up system which is preferably integrated therewith. To this end, each piston assembly 7 may, for example, be fitted with an axial bar which is fixed at one end to the brake ring 3, and its other end may have a non-return projection over which there passes a tube which deforms irreversibly, which tube is secured to the piston proper 10 whose active face is coated in a stainless steel piston insulator serving to transmit braking forces and to improve thermal insulation. The axis of the piston assembly 7 shown is referenced 15.

The torsion tube 2 has a plurality of axial splines such as the spline 11, for coupling with a certain number of stators, i.e. in the present case the front lateral stator referenced SAV and other stators in a central group of disks referenced S2, S3, and S4. The rotors inbetween these stators are referenced R1, R2, R3, and R4, with the last rotor R4 being disposed between the stator S4 and the rear lateral stator referenced SAR. It should be observed that said rear lateral stator SAR does not pass over the splines of the torsion tube as is normally the case, but is connected to said torsion tube 2 via torque transmitting studs 13 which are distributed circumferentially, with the studs 13 being fixed by rivets 14 in associated recesses in the rear face of the rear lateral stator SAR, and being secured to an associated ring 12 which is rigidly secured to the torsion tube 2. For example, twelve studs 13 of the type shown could be used.

In accordance with an essential feature of the invention, the above-specified arrangement of brake disks is organized in two configurations corresponding to operation for two successive wear strokes of the pistons 10.

The first configuration is shown in FIGS. 1 and 2, FIG. 1 showing the arrangement at the beginning of use and FIG. 2 showing the same arrangement at the end of use, i.e. once a first wear stroke of the pistons has been reached.

In FIG. 1, the piston 10 is separated from the facing face 20 of the front lateral stator SAV by clearance constituting clearance for releasing the brake. As the braking unit is used, the set of disks is worn down progressively, with the rotors and stators in the central group wearing on both contacting faces, while the front lateral stator and the rear lateral stator are subject to wear only on their single respective faces that come into contact with a rotor. As wear continues, the clearance take-up system moves the active face of the piston 10 progressively towards the right in the figure, and at the end of use the pistons 10 reach their maximum stroke, referenced d, i.e. each piston is in the position represented diagrammatically by chain-dotted lines in front of the face 20 of the front lateral stator SAV. It is of interest to observe that the rotors R1, R2, R3, and R4 and the stators S2, S3, and S4 of the central group are all of the same thickness in this case. This is favorable from the point of view of thermal balance for the heat sink.

Going from the situation of FIG. 1 to the situation of FIG. 2, i.e. from the beginning of use to the end of use for the first configuration of the disks, corresponds to wear on all of the disks in the brake unit. Thus, each individual disk is thinner in the situation shown in FIG. 2 than in the situation shown in FIG. 1.

The second configuration of the disk arrangement of the invention is shown in FIGS. 3 and 4, which show the arrangement respectively at the beginning of use and at the end of use, i.e. after a new maximum wear stroke of the braking pistons has been fully used up.

In FIG. 3, the pistons are reinitialized by replacing their irreversibly-deformable tubes, thus returning them to the situation in FIG. 1.

In this second configuration, and in accordance with an essential feature of the invention, the arrangement comprises the same front lateral stator SAV that is already partially worn, and the same rotors R1, R2, R3, and R4 and stators S2, S3, and S4 of the central group that are likewise partially worn, but that are now disposed between a carbon spacer disk C at the piston end, with the disk C being built up by clipping together two disks and having a total thickness that is selected to be less than the wear stroke d of the pistons, and a new rear group, i.e. in this case a new rear lateral stator SAR whose total thickness is greater than the total thickness of the preceding rear lateral stator.

At the beginning of use in this configuration, the set of carbon disks built up in this way has a total length that is substantially identical to the total length at the beginning of use in the other configuration, i.e. the set of disks shown in FIG. 3 is of substantially identical length to the set of disks shown in FIG. 1.

The central group of rotors and stators, and also the front lateral stator, i.e. a set of eight disks in this case, is thus used again as a unitary assembly, thereby making it possible to conserve the advantage whereby their respective contact surfaces are paired, i.e. comprising associated contact faces that have been worn together during previous use. In FIG. 3, the double spacer disk C bears against the outside face 20 of the front lateral stator SAV, and the outside face 21 of this double spacer disk is the face that comes in contact with the pistons. After a new period of use, the set of stator and rotor disks continues to wear via their contact faces, while the double spacer disk C is not subject to any wear insofar as it is in contact with the front lateral stator SAV. At the end of use, i.e. once a new maximum wear stroke identical to the first maximum wear stroke has been reached, the situation is that which is shown in FIG. 4. Throughout this second period of use, the disks in the central group also continue to be of thickness that is practically identical.

It is important to observe that the rear lateral stator SAR is initially "thin" for FIG. 1, and then "very thin" in FIG. 2, after which it is replaced for the second configuration so that it is "very thick" in FIG. 3, and finally of "medium" thickness in FIG. 4. In this situation, the rear lateral stator SAR is still thicker than the thin rear lateral stator of FIG. 1, i.e. at the beginning of use in the first configuration.

Naturally, the number of rotors and stators could vary from the example shown herein, and the invention is not limited in any way to a particular number of disks.

Merely by way of indication, the various disks in the set described above could have the following thicknesses and variations in thickness:

FIG. 1: the thickness of the front lateral stator SAV is 26.5 mm, the thickness of the rotors R1, R2, R3, and R2, and of the stators S2, S3, and S4 is 30.6 mm, and the thickness of the "thin" rear lateral stator SAR is 20.7 mm;

FIG. 2: the above thicknesses have been worn down to 23.4 mm for the front lateral stator SAV, to 24.3 mm for the rotors R1, R2, R3, and R4 and for the stators S2, S3, and S4, and to 17.5 mm for the rear lateral stator SAR which has become "very thin";

FIG. 3: the double spacer disk C has a total thickness of 36.0 mm, and the front lateral stator SAV retains its thickness of 23.4 mm, while the rotors R1, R2, R3, and R4 and the stators S2, S3, and S4, retain their thickness of 24.3 mm, and finally the new rear lateral stator SAR is "very thick" having a thickness of 30.6 mm; and FIG. 4: the spacer disk naturally has the same thickness as before, while the thicknesses of the other disks have been worn down, with the front lateral stator SAV coming down to 20.2 mm, the rotors R1, R2, R3, and R4 and the stators S2, S3, and S4 coming down to 18.0 mm, and with the rear lateral stator SAR coming down to 27.5 mm, which constitutes "medium" thickness.

It will be seen that the total difference in length between the beginning and the end of use in each configuration is substantially equal to 50 mm, which is the predetermined value selected for the wear stroke of the pistons.

A variant embodiment is described below with reference to FIGS. 5 to 8.

In this variant, there are to be found a large number of components as already described above, and they are given the same references. The main difference relative to the arrangement described above with reference to FIGS. 1 to 4 lies in the fact that the rear group is now constituted by the rear lateral stator SAR and the rotor R4 which is immediately adjacent thereto.

Figure 6:
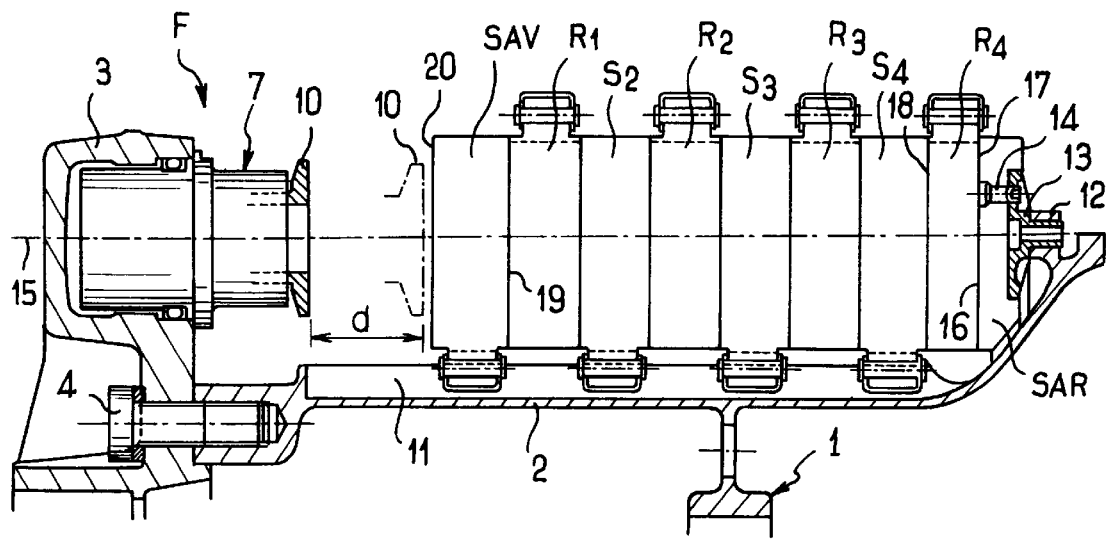

There is thus a rear group SAR & R4 which is "thin" in FIG. 5, i.e. at the beginning of use in the first configuration, "very thin" in FIG. 6, i.e. at the end of the maximum wear stroke of the first configuration, "very thick" in FIG. 7, i.e. at the beginning of use in the second configuration, and finally of "medium" thickness in FIG. 8, i.e. at the end of the maximum wear stroke in the second configuration. In addition, unlike the preceding embodiment, the second configuration now makes use of a single spacer disk C, as can be seen in FIGS. 7 and 8.

Still by way of indication, the following figures can be given for the thicknesses of the disks in the various situations shown in FIGS. 5 to 8:

FIG. 5: the thickness of the front lateral stator SAV is 32.0 mm, the rotors R1, R2, and R2 and the stators S2, S3, and S4 are likewise 32.0 mm thick, the rotor R4 forming a portion of the rear group is 24.0 mm thick ("thin" rotor), and the rear lateral stator SAR is 19.1 mm thick ("thin" rear lateral stator);

FIG. 6: the thickness of the front lateral stator SAV has become 29.0 mm, the thickness of the rotors R1, R2, and R3 and of the stators S2, S3, and S4 of the central group is now 26.1 mm, the thickness of the rotor R4 is 18.1 mm ("very thin" rotor), and the thicknesses of the rear lateral stator SAR is 16.1 mm ("very thin" rear lateral stator);

FIG. 7: the thickness of the spacer disk C is 16.2 mm, the front lateral stator SAV and the rotors R1, R2, and R3 and the stators S2, S3, and S4 of the central group have the same thicknesses as in FIG. 6, which is normal insofar as these already part-worn disks are conserved in the second configuration of the arrangement, whereas the new rotor R4 now has a thickness of 32.0 mm ("very thick" rotor), and the new rear lateral stator SAR now has a thickness of 32.0 mm ("very thick" rear lateral stator); and FIG. 8: the spacer disk C is naturally unchanged in thickness, the thickness of the front lateral stator SAV has become 26.1 mm, the rotors R1, R2, and R3 and the stators S2, S3, and S4 of the central group are of a thickness that has become 20.2 mm, the thickness of the rotor R4 is now 26.1 mm ("medium" thickness rotor), and the rear lateral stator SAR has a thickness of 29.0 mm ("medium" thickness rear lateral stator).

As before, it can be seen that the disk assemblies are of substantially the same total length at the beginning of use in both of the configurations (FIGS. 5 and 7), and that in each configuration, the difference in length between the beginning and the end of use represents substantially the wear stroke d of the pistons, which is 47 mm in this case.

With the dimensions given above, and solely by way of example, it can be seen that the thickness of the rear lateral stator SAR is selected on each occasion to be greater at the end of use in the second configuration than at the beginning of use in the first configuration, and in the variant of FIGS. 5 to 8, the thickness of the rotor R4 is likewise selected to be greater at the end of use in the second configuration than at the beginning of use in the first configuration. The initial thickness of the rotors and stators of the central group is also selected on each occasion so that the thickness of said rotors and stators is greater at the end of use in the second configuration than half the thickness of the same rotors and stators at the beginning of use in the first configuration. Also, the initial thickness of the front lateral stator SAV at the beginning of use in the first configuration is selected on each occasion so that said thickness is greater at the end of use in the second configuration than half the initial thickness of the stators in the central group at the beginning of use in the first configuration, and said initial thickness is also selected so as to be greater at the end of use in the second configuration than half the thickness of the spacer disk C.

These preferred thicknesses are advantageous in enabling optimum reuse of worn disks.

Thus, for the embodiment of FIGS. 1 to 4, on reaching the situation shown in FIG. 4, i.e. the end of use in the second configuration, it is possible to reuse most of the worn disks in another set of disks at the beginning of use in a first configuration for said set:

the front lateral stator SAV can be reused either as a half-stator in a central group (with 5 mm being taken off its worn face), or as a half-spacer disk with 2.5 mm being taken off its worn face, referenced 19 (using the dimensions given above);

each rotor R1, R2, R3, and R4 of the central group can be reused as a half-rotor in another central group with a total of 2.7 mm being taken off, i.e. 1.35 mm per worn face;

each stator S2, S3, and S4 of the central group can be reused as a half-stator, with a total of 2.7 mm being taken off, i.e. 1.35 mm per worn face; and the rear lateral stator SAR, which is of "medium" thickness in this situation, can be reused as a "thin" rear stator, i.e. in the beginning-of-use situation for the first configuration, in a new brake, with 6.75 mm being taken off its worn face.

For the variant of FIGS. 5 to 8, it is possible in the same manner to consider to reusing the various disks that are to be found in the situation shown in FIG. 8, i.e. at the end of use in the second configuration, as follows:

since the spacer disk is not worn, it can be used in another heat sink;

the front lateral stator SAV can be reused either as a central half-stator with 10.15mm taken off its worn face, or else as a spacer disk with 10mm being taken off;

the rotors R1, R2, and R3 of the central group can be reused as half-rotors with a total of 4.3 mm being taken off, i.e. 2.15 mm per worn face;

the stators S2, S3, and S4 of the central group can be reused either as half-stators with a total of 4.3 mm being taken off, i.e. 2.15 mm per worn face, or else as a spacer disk with a total of 4 mm being taken off, i.e. 2 mm per worn face;

the rotor R4 which is "very thin" can be reused as a half-rotor for a new rear group with a total of 2.2 mm being taken off, i.e. 1.1 mm per worn face; and the rear lateral stator SAR can be reused in the same manner as a rear lateral stator for a new rear group, with 10 mm being taken off its single worn face 16.

In all cases, the rotors and stators of the central group can be clipped together so as to be built up from two half-disks of substantially the same thickness that are placed next to each other and that are secured to each other. Also, "the" spacer disk can be constituted in each case by a pair of disks, or by even more disks, in which case it is constituted by a stack of thin disks.

The arrangements described with reference to FIGS. 1 to 8 make it easy to understand the assembly method, i.e. the successive stackings of the brake disks, which method also forms a part of the invention.

In broad terms, the assembly method consists in putting into place a set of disks comprising, successively forwards from the back: a rear group comprising at least one rear lateral stator SAR; a central group of rotors and stators Ri, Sj; and a front lateral stator SAV, this first configuration of the arrangement being conserved until the maximum wear stroke of the pistons is reached, after which the pistons of the braking ring are reinitialized and the set of worn disks is replaced by another set of disks comprising in succession, forwards from the back: a new rear group of thickness greater that the initial thickness of the preceding rear group; the central group of already part-worn rotors and stators Ri, Sj of the preceding set; the already part-worn front lateral stator SAV of the preceding set; and a (single or multiple) carbon spacer disk C of thickness that is smaller than the wear stroke of the pistons, said second configuration of the arrangement being conserved until a new maximum wear stroke of the pistons has been reached.

As mentioned before, the replaced rear group may be constituted by the rear lateral stator SAR on its own (FIGS. 1 to 4), or else it may be constituted by the rear lateral stator SAR together with the rotor R4 which is directly adjacent thereto (FIGS. 5 to 8).

Also, provision may be made at the end of use in the second configuration, as follows:

the rear lateral stator SAR has its worn face 16 machined again so that it can be reused in another set of disks as the rear lateral stator at the beginning of use in the first configuration;

the rotor R4 which is directly adjacent to the rear lateral stator SAR in the variant of FIGS. 5 to 8 has at least one of its two worn faces 17 and 18 machined so as to enable it to be reused in another set of disks as the rotor of the rear group at the beginning of use in the first configuration;

at least one of the rotors and stators Ri, Sj of the central group is machined again on both worn faces so as to be capable of being reused respectively as a halfrotor or as a half-stator in the central group of another set of disks at the beginning of use in the first configuration; and the front lateral stator SAV has its worn face 19 machined again so as to enable it to be reused in another set of disks as a half-stator at the beginning of use in the first configuration, or as a spacer disk or half-disk at the beginning of use in the second configuration.

An arrangement and an assembly method have thus been designed that make it possible to optimize the degree of disk wear by taking best advantage of the maximum wear stroke of the pistons, while conserving as much as possible the paired facing surfaces (only the rearmost face of the central group of disks is machined again on passing from the first configuration to the second), and while maintaining satisfactory thermal equilibrium for the heat sink.

The invention is not limited to the embodiments described above, but on the contrary encompasses any variant that uses equivalent means to reproduce the essential characteristics specified above.

I claim:

1. An arrangement of carbon brake disks for an aircraft brake unit comprising stators coupled to a torsion tube alternating with rotors coupled to the corresponding wheel, with a front lateral stator at one end adjacent to a braking ring fitted with pistons capable of traveling over a predetermined wear stroke, and with a rear lateral stator at the other end, the arrangement being organized in two configurations corresponding to operation over two successive wear strokes of the pistons, a first of the configurations comprising a central group of rotors and stators arranged between the front lateral stator and a rear group comprising at least the rear lateral stator, and the second configuration comprising the same front lateral stator, and the same rotors and stators of the central group, arranged between a supplementary carbon spacer disk that is adjacent to the pistons and coupled to the torsion tube and of a thickness that is less than the wear stroke of the pistons, and a new rear group comprising at least a new rear lateral stator and of a total thickness that is greater than that of the preceding rear group, the sets of carbon disks constituted in this way having, at the beginning of use, substantially the same total length in each of the configurations.

2. An arrangement according to claim 1, wherein the rear group is constituted by the rear lateral stator on its own.

3. An arrangement according to claim 1, wherein the rear group is constituted by the rear lateral stator together with a rotor which is directly adjacent thereto.

4. An arrangement according to claim 1, wherein the thickness of the new rear lateral stator is selected to be greater at the end of use in the second configuration than the thickness of the rear lateral stator at the beginning of use in the first configuration.

5. An arrangement according to claim 4, wherein the rear group is constituted by the rear lateral stator together with the rotor which is directly adjacent thereto, and wherein the thickness of the new rotor directly adjacent to the new rear lateral stator is likewise selected to be greater at the end of use in the second configuration than the thickness of the rotor directly adjacent to the rear lateral stator at the beginning of use in the first configuration.

6. An arrangement according to claim 4, wherein the rear later stator and the new rear lateral stator are connected to the torsion tube via circumferentially distributed studs.

7. An arrangement according to claim 1, wherein the rotors and stators of the central group are of the same thickness.

8. An arrangement according to claim 7, wherein the initial thickness of the rotors and stators of the central group is selected so that, at the end of use in the second configuration, it is greater than half the thickness of the same rotors and stators at the beginning of use in the first configuration.

9. An arrangement according to claim 1, wherein the initial thickness of the front lateral stator is selected so that at the end of use in the second configuration it is greater than half the initial thickness of the stators of the central group at the beginning of use in the first configuration.

10. An arrangement according to claim 9, wherein said initial thickness of the front lateral stator at the beginning of use in the first configuration is likewise selected so that at the end of use in the second configuration it is greater than half the thickness of the supplementary spacer disk.

11. An arrangement according to claim 1, wherein at least one of the disks of the group comprising the supplementary spacer disk, the front lateral stator, and the rotors and stators of the central group is constituted by two same-thickness half-disks put together and secured to each other.

12. A method of assembling carbon brake disks in an arrangement according to claim 1, the method consisting in putting into place a set of disks comprising, in succession, forwards from the back: a rear group comprising at least a rear lateral stator; a central group of rotors and stators; and a front lateral stator, said first configuration of the arrangement being conserved until the maximum wear stroke of the pistons has been reached, after which the pistons of the brake ring are reinitialized, and said set of worn disks is replaced by another set of disks comprising, in succession, forwards from the back: a new rear group comprising at least a new rear lateral stator and being a total thickness that is greater than the initial thickness of the preceding rear group; the central group comprising the already part-worn rotors and stators of the preceding set; the already part-worn front lateral stator of the preceding set; and a supplementary carbon spacer disk of a thickness that is less than the wear stroke of the pistons, said second configuration of the arrangement being conserved until a new maximum wear stroke of the pistons is reached.

13. A method according to claim 12, wherein the replaced new rear group is constituted by the rear lateral stator on its own.

14. A method according to claim 12, wherein the replaced new rear group is constituted by the rear lateral stator together with a new rotor which is directly adjacent thereto.

15. A method according to claim 12, wherein, at the end of use in the second configuration, the rear new lateral stator has its worn face re-machined so as to be capable of being reused in another set of disks as the rear lateral stator at the beginning of use in the first configuration.

16. A method according to claim 14, wherein, at the end of use in the second configuration, the new rotor which is directly adjacent to the new rear lateral stator has at least one of its two worn faces re-machined so as to be capable of being reused in another set of disks as the rotor of the rear group at the beginning of use in the first configuration.

17. A method according to claim 12, wherein at the end of use in the second configuration, at least one of the rotors and stators of the central group is re-machined on both worn faces so as to be capable of being reused respectively as a half-rotor or as a half-stator in the central group of another set of disks at the beginning of use in the first configuration.

18. A method according to claim 12, wherein at the end of use in the second configuration, the front lateral stator has its worn face re-machined so as to be capable of being reused in another set of disks as a half-stator at the beginning of use in the first configuration, or as a supplementary spacer disk or half-disk at the beginning of use in the second configuration.

* * * * *